(12) United States Patent
Young

(10) Patent No.: US 9,948,798 B2
(45) Date of Patent: Apr. 17, 2018

(54) METHOD OF MANAGING A FACSIMILE TRANSMISSION

(71) Applicant: CANON KABUSHIKI KAISHA, Tokyo (JP)

(72) Inventor: Chihsin Steven Young, Irvine, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/199,764

(22) Filed: Mar. 6, 2014

(65) Prior Publication Data

US 2015/0256686 A1 Sep. 10, 2015

(51) Int. Cl.
*H04N 1/00* (2006.01)
*H04N 1/32* (2006.01)

(52) U.S. Cl.
CPC ..... *H04N 1/00477* (2013.01); *H04N 1/32122* (2013.01); *H04N 1/32651* (2013.01); *H04N 2201/3209* (2013.01)

(58) Field of Classification Search
CPC ............. H04N 1/00477; H04N 1/0035; H04N 1/00352
USPC ................................ 358/1.15, 1.16
See application file for complete search history.

(56) References Cited

U.S. PATENT DOCUMENTS

| | | | | |
|---|---|---|---|---|
| 5,862,437 A * | 1/1999 | Kutsuwada | ........ | G03G 15/5004 399/37 |
| 6,980,331 B1 * | 12/2005 | Mooney | ............. | H04N 1/00358 358/3.28 |
| 9,019,534 B2 * | 4/2015 | Koizumi | ............... | G06F 3/1237 358/1.14 |
| 2002/0029259 A1 * | 3/2002 | Okada | .................. | G06F 3/0481 709/219 |
| 2007/0300178 A1 * | 12/2007 | McArdle | ............... | G06F 3/0481 715/781 |
| 2008/0086542 A1 * | 4/2008 | Mukherjee et al. | .......... | 709/219 |
| 2008/0144077 A1 * | 6/2008 | Ahmed | ................ | G09B 21/001 358/1.15 |
| 2010/0195146 A1 * | 8/2010 | Maruyama | .................... | 358/1.15 |
| 2011/0069356 A1 * | 3/2011 | Yoshida | ............. | H04N 1/00217 358/442 |

(Continued)

FOREIGN PATENT DOCUMENTS

| | | |
|---|---|---|
| JP | 2008-166937 A | 7/2008 |
| JP | 2011-254235 A | 12/2011 |

OTHER PUBLICATIONS

Session Timeout Warning and Redirect by Geoff Bishop, retrieved from https://www.codeproject.com/Articles/239798/Session-Timeout-Warning-and-Redirect on Sep. 18, 2017.*

(Continued)

*Primary Examiner* — Eric A Rust
(74) *Attorney, Agent, or Firm* — Canon U.S.A., Inc. IP Division

(57) ABSTRACT

Devices, systems, and methods for managing a facsimile transmission receive, at a fax driver of a fax device, a request to transmit a fax job; determine whether a fax destination number for the fax job exists; in response to determining that the fax destination number for the fax job does not exist, send a request to display a notification; receive the fax destination number for the fax job; and send the received fax destination number for the fax job to the fax device.

14 Claims, 6 Drawing Sheets

(56) References Cited

U.S. PATENT DOCUMENTS

| | | | |
|---|---|---|---|
| 2011/0279363 A1* | 11/2011 | Shoji | G06F 3/04886 345/156 |
| 2012/0084468 A1 | 4/2012 | Kitagawa | |
| 2013/0027745 A1* | 1/2013 | Kang | G03G 15/502 358/1.15 |
| 2013/0057907 A1* | 3/2013 | Lin | 358/1.15 |
| 2013/0094056 A1 | 4/2013 | Kobayashi | |
| 2014/0293339 A1* | 10/2014 | Satou | H04N 1/00488 358/1.15 |
| 2015/0092214 A1* | 4/2015 | Takiguchi | H04N 1/00411 358/1.13 |

OTHER PUBLICATIONS

"Windows Metro Applications Questions." Metro style app for hardware and devices. Jul. 15, 2013. <http://answers.flyp-pdevportal.com/categories/metro/tailoringapps.aspx?ID=32832f37-a6e8-4218-bef5-6fb71256eaae>.

\* cited by examiner

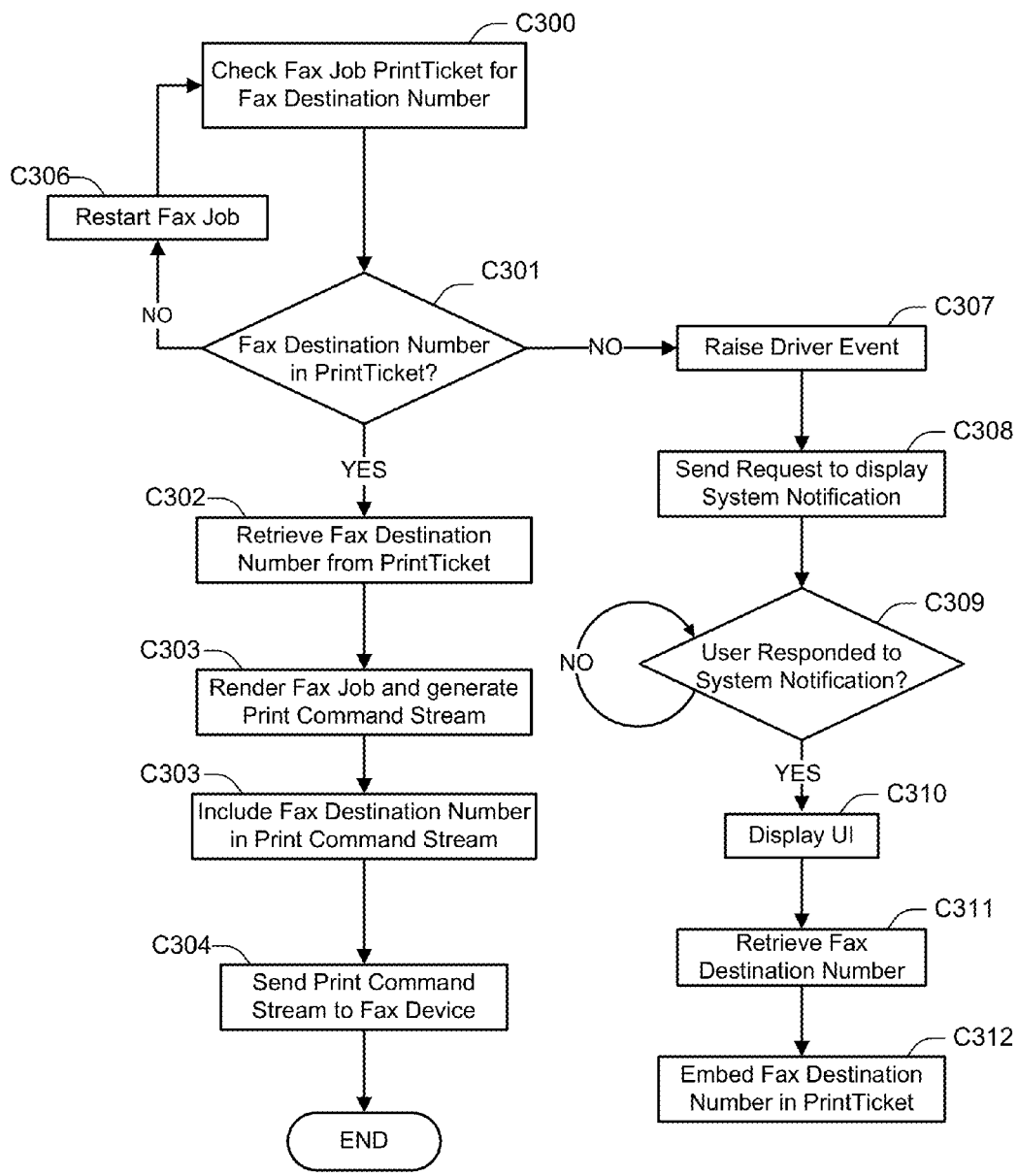

METHOD OF MANAGING A FACSIMILE TRANSMISSION

BACKGROUND

Field of the Disclosure

The present disclosure relates generally to a method of managing a facsimile transmission.

Description of the Related Art

A computer-based fax allows a document to be faxed from a computing device via a fax machine. As more information is being stored digitally, it is convenient for users to be able to fax from a computing device via a fax machine. Additionally, faxing from a computing device creates less paper waste, which leads to environmental benefits and reduction of costs.

Microsoft introduced an operating system that provides a print architecture that does not allow a user interface (UI) to be built into a driver component. Accordingly, in the case of the computer-based fax, a UI (e.g., a dialog box) for retrieving a fax destination number cannot be displayed directly from the driver component. Therefore, the user is required to enter the fax destination number at the fax device instead of entering the fax destination number at the computing device via the UI.

SUMMARY

In one embodiment, a method for managing a facsimile transmission comprises receiving, at a fax driver of a fax device, a request to transmit a fax job, determining whether a fax destination number for the fax job exists, in response to the determination that the fax destination number for the fax job does not exist, sending a request to display a notification, receiving the fax destination number for the fax job, and sending the received fax destination number for the fax job to the fax device.

In one embodiment, one or more computer-readable media store computer-executable instructions that, when executed by one or more computing devices, cause the one or more computing devices to perform operations comprising receiving a request to transmit a fax job; determining whether a fax destination number for the fax job exists; in response to the determination that the fax destination number for the fax job does not exist, sending a request to display a notification; receiving the fax destination number for the fax job; and sending the received fax destination number for the fax job to the fax device.

BRIEF DESCRIPTION OF THE DRAWINGS

FIG. 3C is a flowchart that illustrates an example embodiment of a method for managing a fax transmission.

DETAILED DESCRIPTION

The following description is of certain illustrative embodiments, although other embodiments may include alternatives, equivalents, and modifications. Additionally, the illustrative embodiments may include several novel features, and a particular feature may not be essential to practice the systems and methods described herein.

Figure 1:
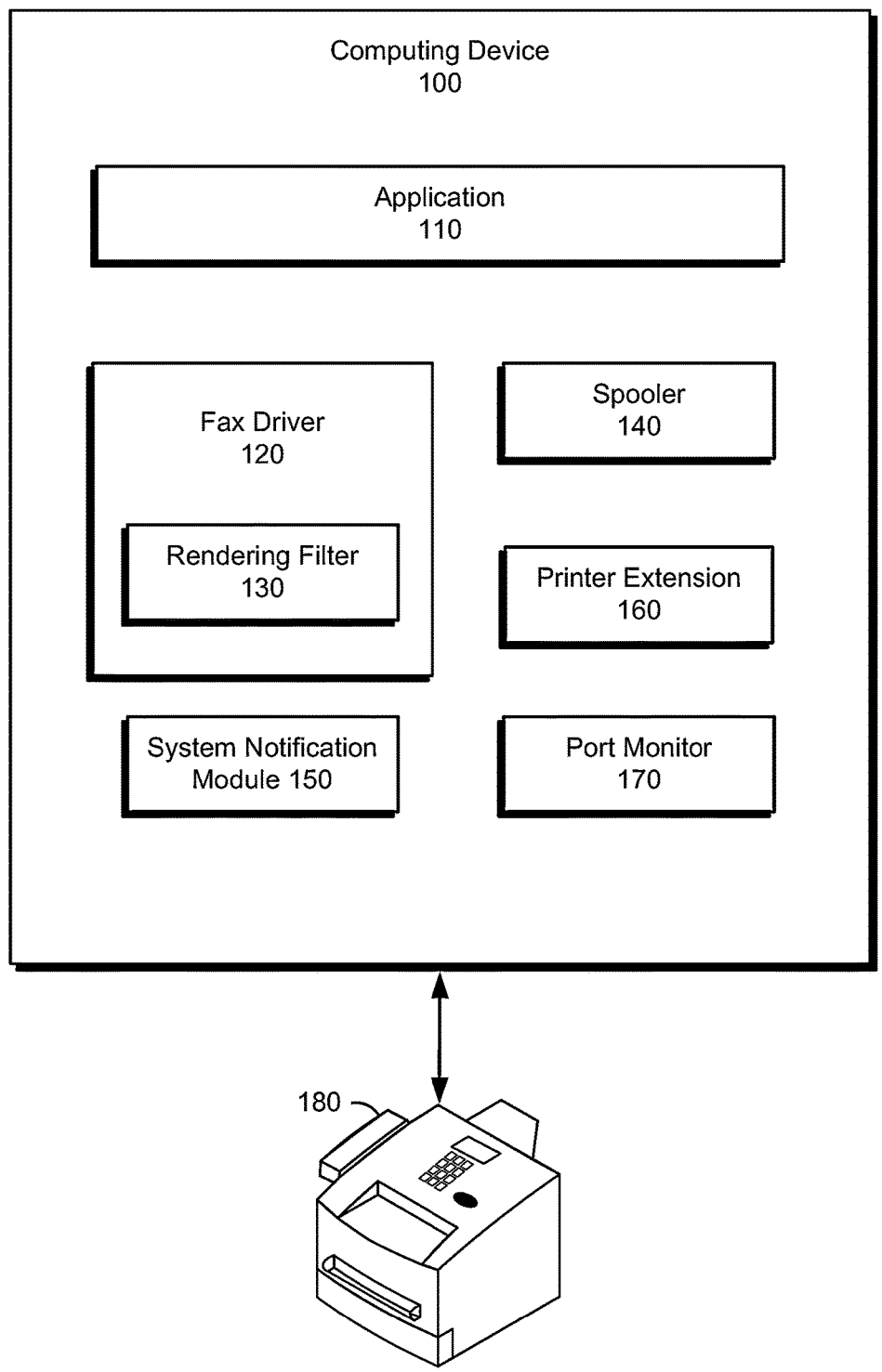
FIG. 1 is a block diagram that illustrates an example embodiment of a system for managing a fax transmission.

FIG. 1 is a block diagram that illustrates an example embodiment of a system for managing a fax transmission. The system for managing a fax transmission includes a computing device 100 and a fax device 180.

The computing device 100 may be any computing device, such as a desktop, laptop computer, and server. In other embodiments, the computing device 100 may be a mobile phone, a personal digital assistant (PDA), or a tablet, and the computing device 100 is capable of communicating via a network and/or may include at least one display that is capable of rendering images. The computing device 100 includes one or more processors (also referred to herein as "CPUs"), which may be a conventional or customized microprocessor(s). The CPUs are configured to read and execute computer-readable instructions, and the CPUs may command and/or control other components of the computing device 100.

The computing device 100 also includes I/O interfaces, I/O devices, or both. The I/O interfaces provide communication interfaces to I/O devices, and the I/O devices may include a keyboard, a display device, a mouse, a touch screen, a light pen, an optical storage device, a microphone, a camera, a scanner, a printer, etc. The computing device 100 also includes memory, which may be volatile (e.g., RAM), non-volatile (e.g., ROM, flash memory), or a combination of both. The computing device 100 further includes a network interface that allows the computing device 100 to communicate with other devices. The computing device 100 also includes a storage device that includes one or more computer-readable or computer-writable storage media. A computer-readable storage medium, as opposed to mere transitory, propagating signals, is a tangible article of manufacture, for example, a magnetic disk (e.g., a hard drive, a floppy disk), an optical disc (e.g., a CD, a DVD, a Blu-ray), a magneto-optical disk, magnetic tape, and semiconductor memory (e.g., a non-volatile memory card, flash memory, a solid-state drive, SRAM, DRAM, EPROM, EEPROM). The computing device 100 includes an operating system, which manages the hardware, the processes, the interrupts, the memory, and/or the file system of the computing device 100. The computing device 100 also incorporates bidirectional (bidi) extension techniques to bidirectionally communicate with a connected device (e.g., the fax device 180). The computing device 100 further includes an application 110, a fax driver 120, a spooler 140, a system notification module 150, a printer extension 160, and a port monitor 170.

The application 110 may be any application that prints data, such as a word processing application, a photo editing application, and a web browser. The application 110 is configured to generate a user interface that presents information to the user, receives information from the user via the computing device 100 (e.g., via the I/O interfaces of the computing device 100), or both. The information may also be presented in any other manner that allows the user to view the information, select one or more options, or both. The application 110 is further configured to receive a fax request, which includes user selected options and a fax document, from the user and generate a fax job based on the fax request for transmitting a fax. Further, the generated fax job is organized in the form of markup language data, for example a PrintTicket document. The PrintTicket document may be XML data that describes the selected options for the fax job. The PrintTicket document may be a document defined by the Print Schema of Microsoft.

The fax driver 120 is configured to receive and validate the fax job that was generated by the application 110. The fax driver 120 may also generate a job identification (ID) for the fax job and include the job ID in the fax job. The fax driver 120 is also configured to communicate with the spooler 140 to temporarily store the fax job (e.g., in the storage device, in the memory). The fax driver 120 may be any fax driver, which cannot invoke a notification or a dialog box to be displayed on an I/O device of the computing device 100. For example, in some embodiments, the fax driver 120 is a Windows v4 Print Driver, and Windows 8 is the operating system. The fax driver 120 also includes a rendering filter 130.

The rendering filter 130 is configured to convert the fax job into a print command stream, which is a format that is supported and understood by the fax device 180. The rendering filter 130 is also configured to receive a fax job from the spooler 140 and is configured to communicate with the port monitor 170. For example, the rendering filter 130 can send an inquiry to the fax device 180 via the port monitor 170 and can receive a response from the fax device 180 via the port monitor 170. Additionally, the rendering filter 130 is configured to provide a request for raising events to invoke functionalities of the printer extension 160, the system notification module 150, or both. In some embodiments, the rendering filter 130 is configured to communicate with the system notification module 150. For example, the rendering filter 130 can send a request for displaying a system notification to the system notification module 150. Furthermore, in some other embodiments, the rendering filter 130 communicates directly with the printer extension 160 and invokes the functionality of the printer extension 160. In some embodiments, the rendering filter 130 is configured to provide a dialog box, which can be presented on a display of the computing device 100. Some of the functions performed by the fax driver 120, including the rendering filter 130, will be described in additional detail hereinafter.

The spooler 140 is configured to receive and store the fax job that was generated by the application 110. The spooler 140 is further configured to communicate with the port monitor 170 to retrieve a status of the fax device 180. The spooler 140 may be configured to release the fax job to the rendering filter 130 in the fax driver 120 after checking the status of the fax device 180 and determining that the fax device 180 is ready to process the fax job. Thus, the fax job may be temporarily stored in the spooler 140. Further, in some embodiments, the spooler 140 sends the fax job to be stored in a repository, such as a spool.

The system notification module 150 is configured to receive a request for displaying a notification from the rendering filter 130, the port monitor 170, or both. In response to receiving the request, the system notification module 150 generates a display that includes a notification, which may be presented on a display device of the computing device 180 (e.g., by means of an I/O interface of the computing device 100). The notification notifies the user of an event that is related to the fax device 180, the fax driver 120, or both, and that requires the attention of the user, for example a fax device being disconnected. Further, the notification may be arranged to receive a user's response. For example, the user can respond to the notification by clicking, tapping, or pressing anywhere within the display of the notification. When a user's response is received by an I/O device via the notification, the system notification module 150 calls the printer extension 160. Then a function of the printer extension 160 is triggered. The additional details of the function of the printer extension 160 will be described hereinafter. The system notification module 150 may be a native notification component, such as a toast notification in Windows. Thus, the system notification module 150 may be a part of an operating system of the computing device 100.

The printer extension 160 is configured to generate a user interface (e.g., dialog box) when invoked, for example by the system notification module 150. In some embodiments, the function of the printer extension 160 is triggered by the rendering filter 130. The user interface generated by the printer extension 160 may present information to a user or receive information from the user via the display of the computing device 100 (e.g., I/O interfaces of the computing device 100). The user interface may present information in the form of a graphical interface that shows a message and a dialog box, which may prompt the user to enter a fax destination number for the fax job or may present an option to cancel the fax job, and that receives user selections of an option, such as cancellation of the fax job. The information may also be presented in any other computer-implemented manner that allows the user to view the information or select options. For example, the printer extension 160 may be, but is not limited to, a printer extension application in Windows 8 or a Windows-store device application in a Windows 8 Metro User Interface (UI). Moreover, in some embodiments, the printer extension 160 may be any standalone application that is capable of performing one or more of the functionality of the printer extension 160.

The port monitor 170 is configured to allow communications between the fax driver 120 and the fax device 180. The port monitor 170 may include a bidi extension (not illustrated) to support the bi-directional communication. The port monitor 170 may receive requests, such as bidi-function calls, and generate corresponding bidi-function-call responses.

The fax device 180 may be any facsimile communication device that is configured to process and transmit facsimile data to a predetermined fax destination number. The fax device 180 is further configured to communicate with the computing device 100 via the port monitor 170.

The entities in the system for managing a fax transmission may communicate via wired or wireless channels that allow the exchange of data between the entities.

Figure 2:
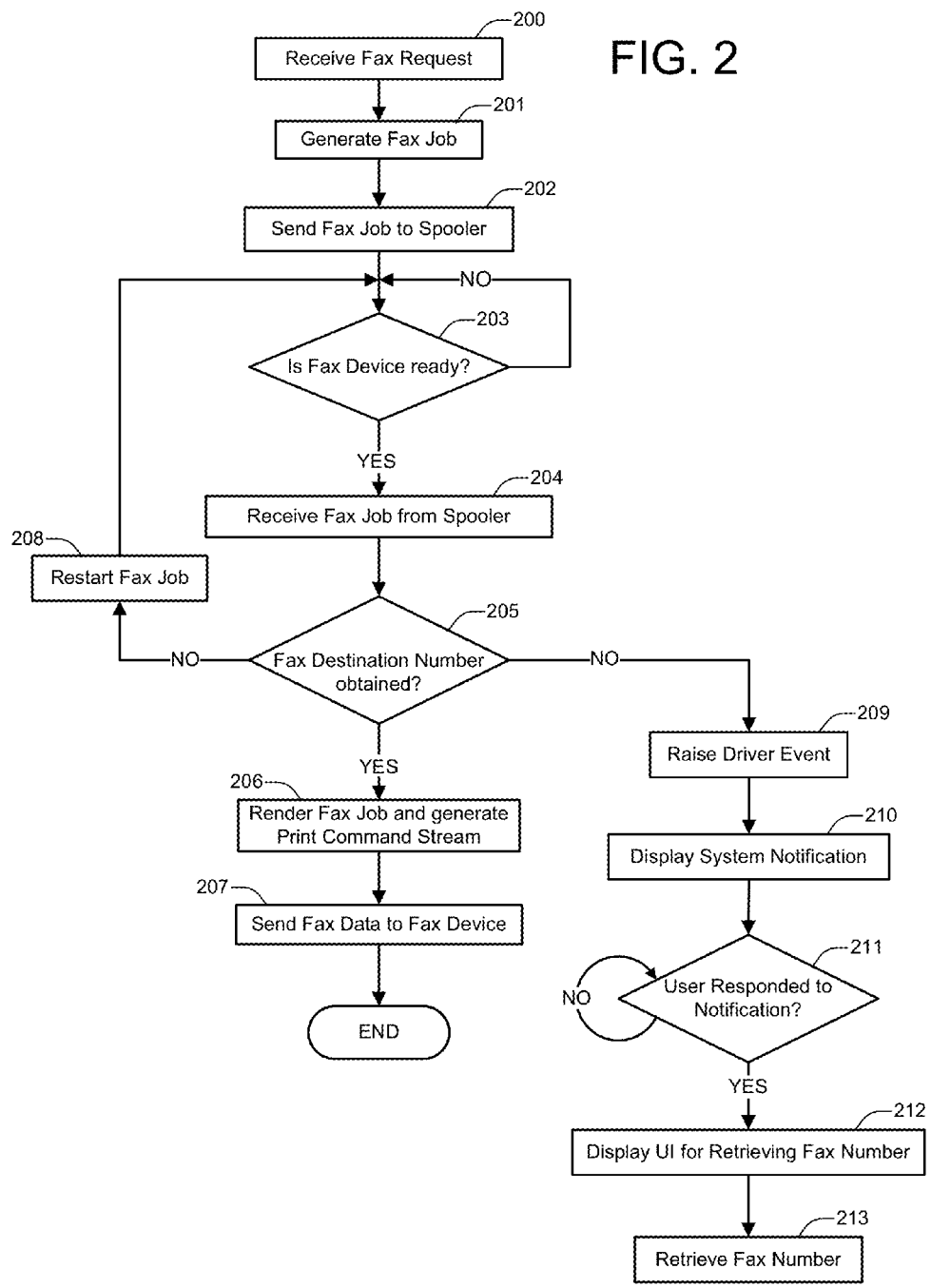
FIG. 2 is a flowchart illustrating an example embodiment of a method for managing a fax transmission.

FIG. 2 is a flowchart illustrating an example embodiment of a method for managing a fax transmission. The blocks of this method and the other methods described herein may be performed by one or more computing devices, for example the systems and devices described herein. Also, although this method and the other methods described herein are each presented in a certain order, some embodiments may perform at least some of the operations in different orders than the presented orders. Examples of possible different orderings include concurrent, overlapping, reordered, simultaneous, incremental, and interleaved orderings. Thus, other embodiments of this method and the other methods described herein may omit blocks, add blocks, change the order of the blocks, combine blocks, or divide blocks into more blocks.

Beginning in block 200, a request for transmitting a fax is received at an application (e.g., the application 110). For example, in some embodiments a user selects one or more desired fax options and submits a fax request to a target fax device (e.g., the fax device 180) via a user interface of the application. In block 201, a fax job is generated at the application according to the selected options and the received fax request. The fax job includes a job ID specific to the fax job. Then, in block 202, the fax job is sent to a spooler (e.g., the spooler 140) to be stored until the fax device is ready to process the fax job via the fax driver of the target fax device. Next, in block 203, whether the fax device is ready to process the fax job is determined. That is, the spooler sends an inquiry to the fax device via the port monitor regarding the status of the fax device. If the status of the fax device indicates that the fax is ready to process the fax job (block 203=YES), then the flow proceeds to block 204. Otherwise, if the status indicates that the fax device is not ready to process the fax job (block 203=NO), the flow repeats block 203 until the fax device is ready to process the fax job. In some embodiments, the number of status inquiries is set by the administrator or the user in the preference settings. In block 204, the fax job is received at a rendering filter (e.g., the rendering filter 130) from the spooler. Then, the flow proceeds to block 205.

In block 205, whether a fax destination number for the fax job has been obtained is determined. The determination of whether the fax destination number for the fax job has been obtained may be made by sending the job ID that is included in the fax job and by verifying whether the fax destination number for the job ID (e.g., the fax job) is stored in the target fax device. If the fax destination number is stored in the target fax device, the fax destination number is determined to have been obtained. Otherwise, if the fax destination number is not stored in the target fax device, then the fax destination number is determined to not have been obtained. In some embodiments, the determination is made by verifying whether the fax destination number for the job ID (e.g., the fax job) is stored in a database. The database may be included in the computing device or may be external and connected to the computing device. Further, the database may communicate with the computing device via a wired or wireless channel. If the fax destination number is stored in the database, the fax destination number is determined to have been obtained. Otherwise, if the fax destination number is not stored in the database, then the fax destination number is determined to not have been obtained. Yet in some other embodiments, the determination is made by verifying whether the fax destination number is included in the fax job. That is, if the fax destination number is included in the fax job, the fax destination number is determined to have been obtained. Otherwise, if the fax destination number is not included in the fax job, then the fax destination number is determined not to have been obtained. If the fax destination number is determined to have been obtained (block 205=YES), the flow proceeds to block 206. Otherwise, if the fax destination number is determined to not have been obtained (block 205=NO), then the flow proceeds to block 208 and block 209.

In block 206, after the fax destination number is determined to have been obtained, the fax job that was received from the spooler is rendered and a print command stream is generated at the rendering filter. Then in block 207, the print command stream is sent from the rendering filter to the target fax device via the port monitor. Then, the target fax device transmits the print command stream to the fax destination number of the fax job. In some embodiments, the fax destination number of the fax job is deleted from the target fax device after the fax job is transmitted to the fax destination number. Then the flow ends.

If the fax destination number for the fax job is determined to not have been obtained in block 205, then in block 208, the fax job is restarted. For example, the rendering filter sends instructions to the spooler to restart the fax job. Thus, the flow returns to block 203.

In addition, if the fax destination number for the fax job is determined to not have been obtained in block 205, then in block 209, a driver event is raised. A driver event may be a pre-defined event that when detected, a displaying of a system notification is invoked.

Next, in block 210, a system notification is displayed by a system notification module (e.g., the system notification module 150) via a display device of a computing device (e.g., via an I/O interface of the computing device 100). In some embodiments, the system notification is arranged so that the system notification is displayed for a predetermined period of time. Further, the system notification may be arranged to disappear after the predetermined period of time and appear again after a predetermined period of time. For example, if the user does not respond to the system notification within in a predetermined period of time, the system notification disappears. Then, after another predetermined period of time, the system notification may be displayed again. The number of times the system notification is displayed may be arbitrarily set by the user or a system administrator. Furthermore, the system notification module may receive the user response via the system notification.

In block 211, whether the user responded to the system notification is determined. The user may respond to the system notification by clicking, tapping, or pressing anywhere on the system notification. If the user responds to the system notification (block 211=YES), then the flow proceeds to block 212. Otherwise, if the user does not respond to the system notification (block 2011=NO), then the flow repeats block 211.

In block 212, in response to the user responding to the system notification, a user interface (UI) for retrieving a fax destination number from a user is displayed on the display of the computing device. The UI may have a space for the user to enter the fax destination number. The UI may also include a message prompting the user to enter the fax destination number in the space.

Then in block 213, the fax destination number is retrieved via the UI displayed in block 212. If the determination of whether the fax destination number for the fax job exists was made by inquiring to the fax device, then the retrieved fax destination number is associated with the job ID, and the fax destination number associated with the job ID is stored in the fax device.

If the determination of whether the fax destination number for the fax job exists was made by verifying with the database, then the retrieved fax destination number is sent to and stored in the database. The fax destination number may be associated with the job ID before being stored in the database.

If the determination of whether the fax destination number for the fax job exists was made by verifying with the fax job, then the retrieved fax destination number is included in the fax job at the printer extension. Then, the fax job including the fax destination number is sent to the fax device via the rendering filter.

Figure 3A:
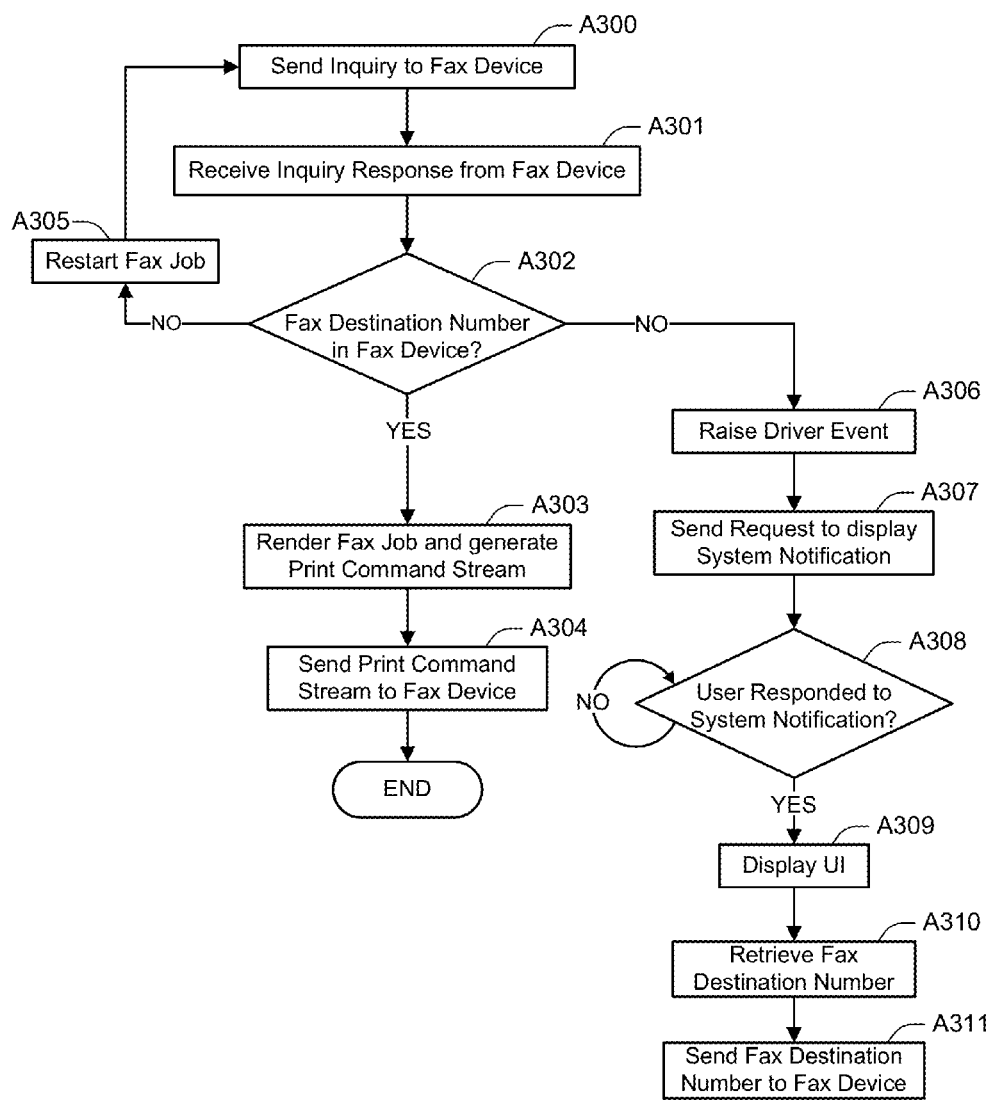
FIG. 3A is a flowchart that illustrates an example embodiment of a method for managing a fax transmission.

FIG. 3A is a flowchart that illustrates an example embodiment of a method for managing a fax transmission. After a fax device (e.g., the fax device 180) is determined to be ready to process a fax job, a spooler (e.g., the spooler 140) sends the fax job to a rendering filter (e.g., the rendering filter 130) before block A300.

Next, in block A300, the rendering filter, which received the fax job from the spooler, sends a fax destination number inquiry to the fax device. That is, the rendering filter sends an inquiry to the fax device regarding whether the fax destination number of the fax job sent from the spooler is stored in the fax device. The fax destination number inquiry may be sent to the fax device via a port monitor. In block A301, the rendering filter receives the response to the fax destination number inquiry from the fax device. Then, in block A302, the rendering filter determines whether the fax device has the fax destination number for the fax job according to the response received from the fax device regarding the fax destination number. If the fax device has the fax destination number for the fax job (block A302=YES), then the flow proceeds to block A303. Otherwise, if the fax device does not have the fax destination number for the fax job (block A302=NO), the flow proceeds to block A305 and block A306.

If the fax destination number is stored in the fax device, then in block A303 the rendering filter renders the fax job and generates a print command stream (e.g., a print command stream) in a format that is supported by the fax device. Then, in block A304, the rendering filter sends the print command stream to the fax device. When the fax device receives the print command stream, the fax device transmits the fax to the fax destination number of the fax job.

If the fax destination number of the fax job is not stored in the fax device, then in block A305, the rendering filter sends instructions to the spooler to restart the fax job. In some embodiments, the rendering filter may send a request to restart the fax job any time after the determination that the fax destination number does not exist in the fax device. Then, the flow returns to block A300.

In addition, if the fax destination number of the fax job is not stored in the fax device, then in block A306, the rendering filter raises a driver event. The driver event is a pre-defined event that is related to the fax driver or the target fax device and that triggers a certain process to occur. For example, when a driver event is raised, an event handler is invoked. Then, the event handler triggers one or more functions associated with the driver event. The one or more functions are associated with the driver event in advance. Further, the driver event may be raised by sending a command for triggering a driver event to the fax device. In some embodiments, a driver event is raised by turning a device status bit, which indicates a pre-defined status, on and off. Furthermore, a driver-event file is created to add an event that triggers the bidi-communication schema property in the print schema. After the driver event is raised, then in block A307, a system notification is displayed via the I/O interfaces of the computing device. In some embodiments, the rendering filter sends a request to the system notification module to display the system notification by communicating directly to the system notification module, for example, with a common application programming interface. The system notification may be displayed anywhere on the display of the computing device. For example, in some embodiments the system notification is displayed in the upper-right corner of the display. Further, the system notification may be designed to receive a user response.

In block A308, whether the user responded to the system notification displayed in block A306 is determined. If the user responds to the system notification, for example by clicking, tapping, touching, or pressing the system notification displayed via the I/O interface of the computing device (block A308=YES), then the printer extension is launched and the flow proceeds to block A309. Otherwise, if the user does not respond to the system notification (block A308=NO), then block A308 is repeated. The system notification may be repeatedly displayed on the display until the user responds.

In block A309, a user interface (UI) for prompting a user to enter a fax destination number of the fax job is displayed by the printer extension. The UI may be a dialog box which is capable of retrieving a fax destination number from the user. In block A310, the printer extension retrieves the fax destination number of the fax job from the user via the UI. In block A311, the fax destination number is sent from the printer extension to the fax device. The fax destination number may be stored in the fax device.

Figure 3B:
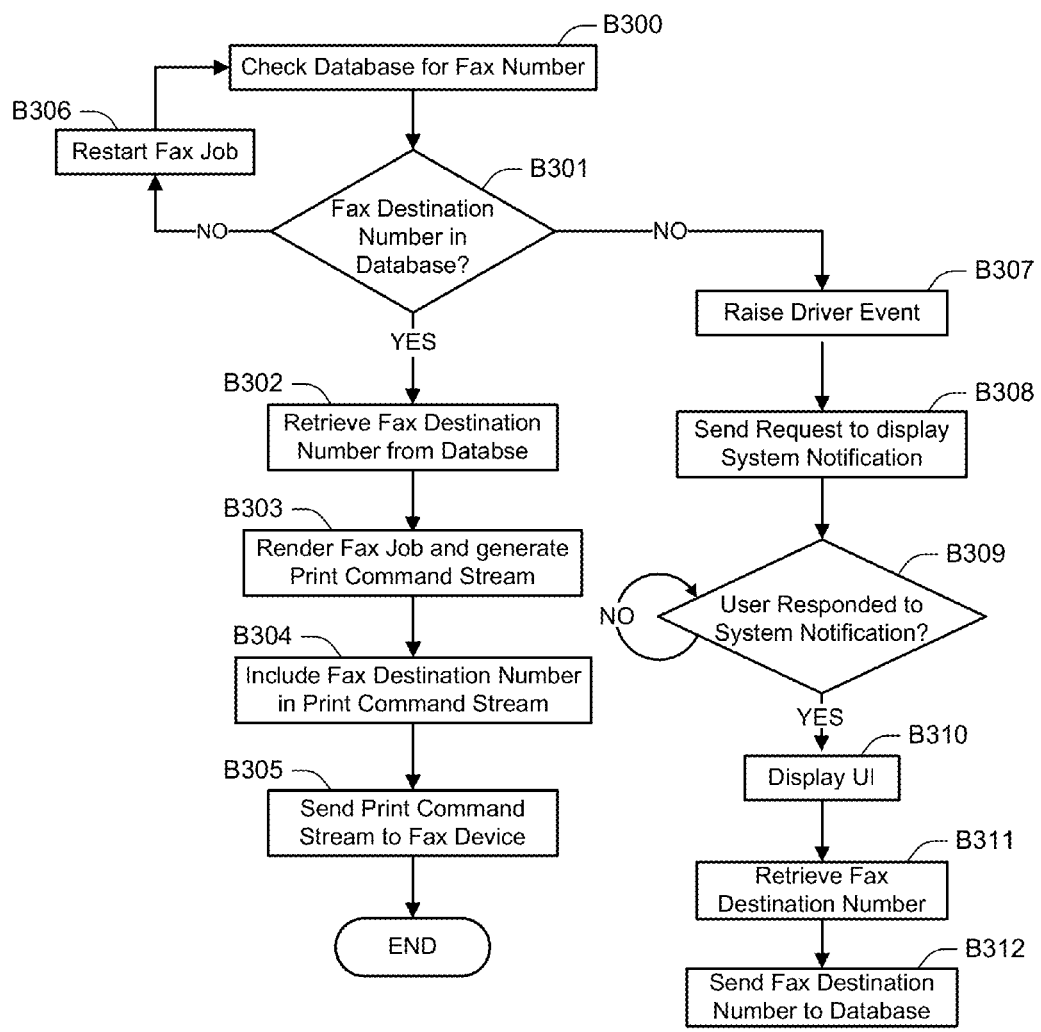
FIG. 3B is a flowchart that illustrates an example embodiment of a method for managing a fax transmission.

FIG. 3B is a flowchart that illustrates an example embodiment of a method for managing a fax transmission. After a fax device is determined to be ready to process a fax job, a spooler sends the fax job to a rendering filter.

In block B300, the rendering filter checks a database for the fax destination number of the fax job. The database may be included in the computing device. In some embodiments, the database is externally connected to the computing device. In block B301, the rendering filter determines whether the fax destination number for the fax job is stored in the database. If the fax destination number for the fax job is stored in the database (block B301=YES), the flow proceeds to block B302. Otherwise, if the fax destination number of the fax job is not stored in the database (block B301=NO), the flow proceeds to block B306 and block B307.

If the fax destination number is stored in the database, then in block B302, the rendering filter retrieves the fax destination number of the fax job from the database. In block B303, the rendering filter renders the fax job and generates a print command stream according to the fax job.

Then, in block B304, the rendering filter includes the fax destination number of the fax job retrieved from the database into the print command stream. In some embodiments, after the rendering filter retrieves the fax destination number of the fax job from the database, the fax destination number of the fax job is sent to and stored at the target fax device instead of included in the print command stream. In such embodiments, block B304 is omitted, and the fax destination number of the fax job and the print command stream are separately sent to the target fax device.

In block B305, the rendering filter sends the print command stream to the target fax device. The print command stream is in a format that is understood by the target fax device. When the target fax device receives the print command stream, the target fax device transmits the print command stream to the fax destination number associated with the print command stream.

If the fax destination number is not stored in the database, then in block B306, the rendering filter instructs the fax job to be restarted. Then, the flow returns to block B300.

In addition, if the fax destination number of the fax job is not stored in the database, then in block A307, the rendering filter raises a driver event. The driver event is a pre-defined event that is related to the fax driver or the target fax device and that triggers a certain process to occur. For example, when a driver event is raised, an event handler is invoked. Then, the event handler triggers one or more functions associated with the driver event. The one or more functions are associated with the driver event in advance. Further, the driver event may be raised by sending a command for triggering a driver event to the fax device. In some embodiments, a driver event is raised by turning a device status bit, which indicates a pre-defined status, on and off. Furthermore, a driver-event file is created to add an event that triggers the bidi-communication schema property in the print schema. After the driver event is raised, then in block A308, a system notification is displayed via the I/O interfaces of the computing device. In some embodiments, the rendering filter sends a request to the system notification module to display the system notification by communicating directly to the system notification module, for example, with a common application programming interface. The system notification may be displayed anywhere on the display of the computing device. For example, in some embodiments the system notification is displayed in the upper-right corner of the display. Further, the system notification may be designed to receive a user response.

In block B309, whether the user has responded to the system notification is determined. If the user has responded to the system notification (block B309=YES), then the printer extension is launched, and the flow proceeds to block B310. Otherwise, if the user has not responded to the system notification (block B309=NO), then block B309 is repeated until the user responds to the system notification.

If the user responds to the system notification and the printer extension is launched, then, in block B310, the printer extension displays a UI that prompts the user to input the fax destination number for the fax job. Then, in block B311, the fax destination number is retrieved from the user via the UI. In block B312, the printer extension sends the retrieved fax destination number to the database.

FIG. 3C is a flowchart that illustrates an example embodiment of a method for managing a fax transmission. After a fax device is determined to be ready to process a fax job, a spooler sends the fax job to a rendering filter.

Then in block C300, the rendering filter checks the fax job received from the spooler for the fax destination number of the fax job. The fax job includes a PrintTicket document, which is XML data that describes the selected options for the fax job. Thus, the rendering filter parses the fax job and checks whether the fax destination number is included in the PrintTicket of the fax job.

In block C301, whether the fax destination number is included in the fax job is determined. If the fax destination number was included in the PrintTicket of the fax job (block C301=YES), then the flow proceeds to block C302. Otherwise, if the fax destination number was not included in the PrintTicket of the fax job (block C301=NO), the flow proceeds to block C306 and block C307.

If the PrintTicket of the fax job includes the fax destination number for the fax job, then in block C302, the rendering filter retrieves the fax destination number from the PrintTicket. Then, in block C303, the rendering filter renders the fax job into a print command stream that is in a format that is understood by the fax device. The format of the print command stream may be a print command stream. Next, in block C303, the rendering filter includes the fax destination number retrieved from the PrintTicket to the print command stream. In some embodiments, instead of including the fax destination number to the print command stream, the rendering filter sends the fax destination number to the target fax device. In such embodiments, block C304 is omitted, and the fax destination number and the print command stream are separately sent to the target fax device.

In block C305, the rendering filter sends the print command stream to the fax device. The print command stream may be sent from the rendering filter to the fax device via the port monitor. When the fax device receives the print command stream, the fax device transmits the print command stream to the fax destination number according to the print command stream.

If the PrintTicket of the fax job does not include the fax destination number for the fax job, then in block C306, the rendering filter instructs the spooler to restart the fax job, and the flow returns to block C300.

Further, if the PrintTicket of the fax job does not include the fax destination number for the fax job, then, in block C307, the rendering filter raises a driver event, for example by sending a request to the fax device to raise a driver event. In block C308, after the driver event has been raised, a system notification is displayed by the system notification module via the I/O interfaces of the computing device. The system notification notifies the user of an event that needs the user's attention. The system notification may be further arranged to prompt the user to respond to the system notification and to receive the user's response.

In block C309, whether the user responded to the system notification is determined. If the user responds to the system notification, for example by clicking, tapping, or pressing the system notification (block C309=YES), then the flow proceeds to C310. Otherwise, if the user does not respond to the system notification (block C309=NO), then block C309 is repeated.

In block C310, the printer extension displays a user interface (UI) to the user via a display of the computing device. The UI may include a message identifying the fax job and prompting the user to enter the fax destination number associated with the identified fax job into a space provided within the UI. In block C311, the printer extension retrieves the fax destination number of the fax job via the UI. In block C312, the printer extension embeds the fax destination number in the PrintTicket.

Figure 4:
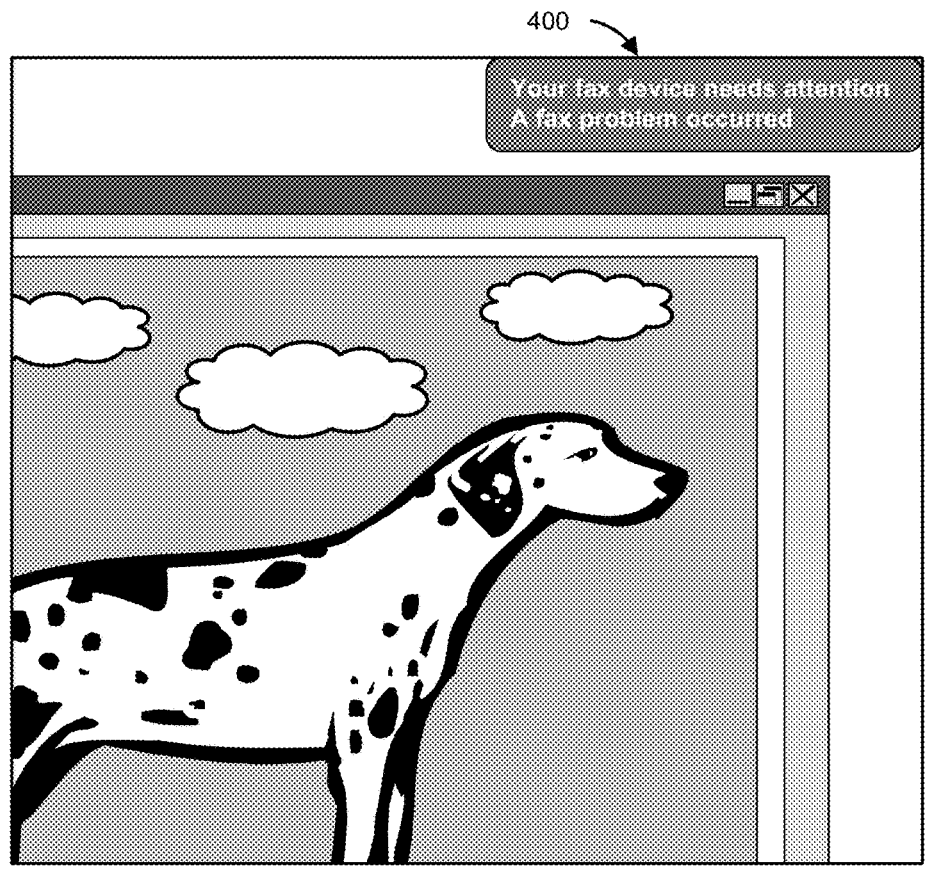
FIG. 4 illustrates an example embodiment of a system notification.

FIG. 4 illustrates an example embodiment of a system notification 400. The system notification 400 notifies the user of a problem when the target fax device (e.g., the fax device 180) encounters a problem (e.g., a driver event) while processing a fax job. For example, the problem may be no fax destination number found for the fax job, a disconnected network, or a busy phone line. The system notification 400 is presented via I/O interfaces of the computing device (e.g., the computing device 100) as a pop-up message. Further, the system notification 400 is configured to receive a user response, such as clicking, tapping, touching, or pressing. Although the illustrated system notification 500 notifies the user of a problem the fax device has encountered by displaying "Your fax device needs your attention. A fax problem occurred" in the display box, the message in the display box may include a message prompting the user to respond to the system notification 400 by clicking, tapping, touching, or pressing the system notification 400.

Figure 5:
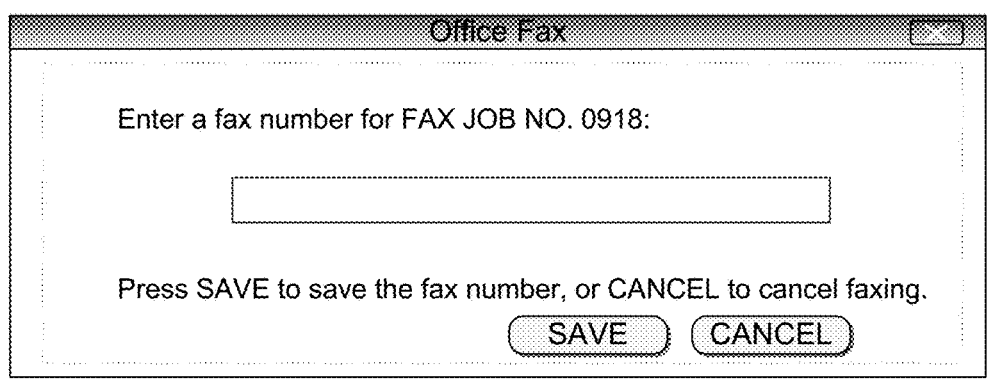
FIG. 5 illustrates an example embodiment of a dialog box.

FIG. 5 illustrates an example embodiment of a dialog box (e.g., the UI for retrieving the fax destination number). The dialog box includes a description of the document to be faxed, a message that prompts the user to enter the fax destination number for the described fax job, a space to enter the fax destination number (e.g., fax number), and an option to cancel faxing the document or to save the fax destination number. The description of the document may be a fax job identification (ID), which is presented as a series of numbers and/or alphabetic characters, as the submission time and date, and/or as the user's ID. The user selects a CANCEL button or an "X" button located in the corner of the dialog box if the user decides to discontinue faxing the document. Otherwise, the user enters the fax destination number and selects a SAVE button to proceed with the faxing of the document. The dialog box is displayed via the computing device (e.g., I/O interfaces of the computing device 100).

The above described devices, systems, and methods can be implemented by supplying one or more computer-readable media having stored thereon computer-executable instructions for realizing the above described operations to one or more computing devices that are configured to read the computer-executable instructions and execute them. In this case, the systems or devices perform the operations of the above-described embodiments when executing the computer-executable instructions. Also, an operating system on the one or more systems or devices may implement the operations of the above described embodiments. Thus, the computer-executable instructions or the one or more computer-readable media storing the computer-executable instructions thereon constitute an embodiment.

Any applicable computer-readable medium (e.g., a magnetic disk (including a floppy disk, a hard disk), an optical disc (including a CD, a DVD, a Blu-ray disc), a magneto-optical disk, a magnetic tape, and a solid state memory (including flash memory, DRAM, SRAM, a solid state drive)) can be employed as a computer-readable medium for the computer-executable instructions. The computer-executable instructions may be written to a computer-readable medium provided on a function-extension board inserted into the device or on a function-extension unit connected to the device, and a CPU provided on the function-extension board or unit may implement the operations of the above-described embodiments.

While the above disclosure describes illustrative embodiments, it is to be understood that the invention is not limited to the above disclosure. To the contrary, the invention covers various modifications and equivalent arrangements within the spirit and scope of the appended claims.

What is claimed is:

1. A method for performing a facsimile transmission in an information processing apparatus, the method comprising:
    generating a fax job based on a fax document if a fax option is selected by a user, wherein the fax job is stored in a spooler of the information processing apparatus;
    transmitting the fax job to a fax device, wherein the fax device is an external device of the information processing apparatus; and
    causing a display device to display a user-interface for designating a fax destination number,
    wherein it is determined whether a fax destination number for the fax job has been obtained by the information processing apparatus communicating with a fax device,
    wherein a notification regarding a fax process is displayed on the display device if it is determined that a fax destination number for the fax job has not been obtained, whereby the notification and an object different from the notification are concurrently displayed on the display device,
    wherein, after a predetermined period of time, the notification is caused to disappear from the display device and display of the object is maintained on the display device,
    wherein the user-interface for designating the fax destination number is displayed on the display device after the fax job is transmitted from the spooler to a rendering filter if a user responds to the notification while the notification is being displayed on the display device,
    wherein a job identifier for the fax job and a fax destination number input using the user-interface for designating the fax destination number are transmitted to the fax device, and
    wherein a processing based on the fax job is performed without displaying the notification if a fax destination number for the fax job has been obtained.

2. The method of claim 1, further comprising sending an inquiry regarding whether the fax job is stored in a fax device.

3. The method of claim 1, further comprising verifying whether the fax destination number for the fax job is stored in the fax device,
    wherein the fax destination number for the fax job is obtained if it is determined that the fax destination number is stored in the fax device by communicating with the fax device.

4. The method of claim 1, further comprising sending the fax job to the fax device in response to determining that the fax destination number for the fax job has been obtained.

5. The method of claim 1, further comprising sending a request to restart the fax job in response to determining that the fax destination number for the fax job has not been obtained.

6. The method of claim 5, wherein sending the request to restart the fax job is repeated until the fax destination number for the fax job is received via the user-interface.

7. The method of claim 1, wherein the user-interface is displayed on a display device of a computing device.

8. The method of claim 1, wherein the fax destination number is a phone number.

9. The method according to claim 1, further comprising displaying the notification to the display device if a fax destination number for the fax job has not been obtained after a fax request for transmitting a fax is requested.

10. The method according to claim 9, further comprising displaying a fax destination number user interface (UI) including identification information of a target fax job on the display device if a user has responded to the notification while the notification is displayed on the display device.

11. The method according to claim 9, wherein the notification includes a cancel instruction unit configured to receive a cancel instruction of a fax transmission.

12. The method according to claim 1, further comprising raising an event for a notification of an operating system if the fax destination number for the fax job is not obtained.

13. The method according to claim 1, wherein the processing based on the fax job is processing of generating a command corresponding to the fax job.

14. The method according to claim 1,
    wherein a job identification (ID) is transmitted, as the job identifier for the fax job, to the fax device, and
    wherein the fax device retrieves a fax destination number corresponding to the job ID, and it is determined that the fax destination number corresponding to the job ID is not obtained if the fax destination number corresponding to the job ID is not found.

* * * * *